United States Patent [19]

Sasaki

[11] Patent Number: 5,109,816
[45] Date of Patent: May 5, 1992

[54] DIRECT FUEL INJECTION TYPE SPARK IGNITION INTERNAL COMBUSTION ENGINE

[75] Inventor: Shizuo Sasaki, Susono, Japan

[73] Assignee: Toyota Jidosha Kabushiki Kaisha, Toyota, Japan

[21] Appl. No.: 690,588

[22] Filed: Apr. 24, 1991

[30] Foreign Application Priority Data

Apr. 27, 1990 [JP] Japan .................... 2-44648[U]
Aug. 10, 1990 [JP] Japan .................... 2-210460

[51] Int. Cl.⁵ .................................... F02R 31/00
[52] U.S. Cl. ............................. 123/263; 123/276
[58] Field of Search ............ 123/263, 276, 262, 279, 123/301, 260, 305

[56] References Cited

U.S. PATENT DOCUMENTS

| | | | |
|---|---|---|---|
| 2,935,054 | 5/1960 | Franke et al. | 123/263 |
| 3,304,922 | 2/1967 | Hideg | 123/263 |
| 3,641,986 | 2/1972 | Fricker et al. | 123/263 |
| 3,809,031 | 5/1974 | Maurer et al. | 123/263 |
| 3,954,089 | 5/1976 | Hardesly et al. | 123/263 |
| 4,207,843 | 6/1980 | List et al. | 123/263 |
| 4,300,498 | 11/1981 | May | 123/263 |
| 4,522,173 | 6/1985 | Agache | 123/276 |
| 4,733,642 | 3/1988 | Uhida | 123/276 |
| 4,977,874 | 12/1990 | Ongetta | 123/263 |

FOREIGN PATENT DOCUMENTS

| | | | |
|---|---|---|---|
| 2934644 | 3/1981 | Fed. Rep. of Germany | 123/263 |
| 3245780 | 12/1983 | Fed. Rep. of Germany | 123/263 |
| 55-043216 | 3/1980 | Japan | 123/263 |
| 55-075530 | 6/1980 | Japan | 123/263 |
| 61-173728 | 10/1986 | Japan . | |
| 62-191622 | 8/1987 | Japan . | |
| 1134747 | 1/1985 | U.S.S.R. | 123/263 |

*Primary Examiner*—Raymond A. Nelli
*Attorney, Agent, or Firm*—Kenyon & Kenyon

[57] ABSTRACT

A direct fuel injection type spark ignition internal combustion engine includes a piston/cylinder structure including a deep dish portion, a peripheral portion, and a shallow dish portion. The peripheral portion has a depth smaller than the deep dish portion and greater than the shallow dish portion and a diameter larger than the deep dish portion and smaller than the shallow dish portion. At medium engine loads, fuel is injected toward an edge portion defined between the deep dish portion and the peripheral portion and is divided by the edge portion into two portions. One portion flows into the peripheral portion and is evaporated to generate a moderately rich air-fuel mixture which helps to propagate flame from the deep dish portion to the remaining portion of a combustion chamber including the shallow dish portion.

13 Claims, 7 Drawing Sheets

W: INJECTION INTO FUEL EVAPORATION GROOVE
X: INJECTION INTO SHALLOW DISH PORTION
Y: INJECTION INTO PERIPHERAL PORTION
Z: INJECTION INTO BOTTOM OF DEEP DISH PORTION

FIG. 13

W: INJECTION INTO FUEL EVAPORATION GROOVE
X: INJECTION INTO SHALLOW DISH PORTION
Y: INJECTION INTO PERIPHERAL PORTION
Z: INJECTION INTO BOTTOM OF DEEP DISH PORTION

FIG. 14

W: INJECTION INTO FUEL EVAPORATION GROOVE
X: INJECTION INTO SHALLOW DISH PORTION
Y: INJECTION INTO PERIPHERAL PORTION
Z: INJECTION INTO BOTTOM OF DEEP DISH PORTION

DIRECT FUEL INJECTION TYPE SPARK IGNITION INTERNAL COMBUSTION ENGINE

BACKGROUND OF THE INVENTION

1. Field of the Invention

The present invention relates to a direct fuel injection type spark ignition internal combustion engine in which fuel is directly injected into a cylinder of the engine onto a surface of a recessed dish portion formed in a top portion of the piston. The fuel adhering to the surface of the dish portion is evaporated to generate a combustible gas which is ignited by a spark plug.

2. Description of the Prior Art

Direct fuel injection type spark ignition internal combustion engines are disclosed, for example, in Japanese Utility Model Publication SHO 61-173728. This publication discloses a piston/cylinder arrangement with a deep recessed dish portion and a shallow recessed dish portion formed in a top portion of the piston. In this engine, fuel injected at low engine loads flows into the deep dish portion only, and fuel injected at high engine loads flows into both the deep dish portion and shallow dish portion.

However, there are the following problems to be solved with the prior art engine:

(a) At medium engine loads, a relatively large portion of fuel is injected onto a surface of the shallow dish portion. Since the shallow dish portion has a large area, the fuel injected onto the surface of the shallow dish portion is so widely spread that the fuel-air mixture in the shallow dish portion becomes too lean to burn smoothly As a result, flame propagation is not smooth in a medium engine load operation.

(b) At high engine loads, the fuel injected at an early stage of a fuel injection period flows onto the surface of the shallow dish portion. Since the piston is not yet at its top position, a swirl is still weak. Thus, fuel evaporation at the surface of the shallow dish portion is insufficient, and it is difficult to obtain a perfect combustion in a high engine load operation.

(c) At low engine loads, fuel is injected onto the surface of the deep dish portion where the fuel is evaporated with the help of a swirl. Since the prior art engine has no particular means for guiding the evaporated fuel to a spark plug position, improvement in ignition at low engine loads is desirable.

SUMMARY OF THE INVENTION

An object (an essential object) of the invention is to provide a direct fuel injection type spark ignition internal combustion engine wherein a smooth flame propagation is obtained even at medium engine loads Another object (a subsidiary object) of the invention is to provide a direct fuel injection type spark ignition internal combustion engine wherein a smooth fuel evaporation at a surface of a shallow dish portion is obtained at high engine loads.

Other object (a subsidiary object) of the invention is to provide a direct fuel injection type spark ignition internal combustion engine wherein a smooth ignition is obtained at low engine loads.

The above-described essential object can be attained by a direct fuel injection type spark ignition internal combustion engine in accordance with the present invention which includes a piston/cylinder structure, a spark plug, and a fuel injection nozzle.

More particularly, the piston/cylinder structure includes a cylinder, a piston reciprocally movable in the cylinder, and a cylinder head located above the cylinder. The cylinder, the piston and the cylinder head define a combustion chamber having an axis that coincides with the cylinder axis and a radially outer portion. The piston includes a deep recessed dish portion (hereinafter, a deep dish portion), a recessed peripheral portion (hereinafter, a peripheral portion) at least partially surrounding the deep dish portion, a shallow recessed dish portion (hereinafter, a shallow dish portion) at least partially surrounding the peripheral portion, and a plug pocket, all formed in a top portion of the piston. The peripheral portion has a depth smaller than the deep dish portion and greater than the shallow dish portion and a diameter larger than the deep dish portion and smaller than the shallow dish portion The deep dish portion has a side surface where the plug pocket opens to the deep dish portion. The deep dish portion includes a fuel evaporation groove formed in the side surface upstream of the plug pocket in a direction of a swirl generated in the deep dish portion and an edge portion located at an upper end of the fuel evaporation groove so that the fuel evaporation groove is connected to the peripheral portion via the edge portion.

The spark plug is located close to the axis of the combustion chamber and has an ignition portion protruding into the combustion chamber. The plug pocket of the piston receives the ignition portion of the spark plug therein when the piston comes to its highest position.

The fuel injection nozzle is located at the radially outer portion of the combustion chamber. The fuel injection timing of the fuel injection nozzle is predetermined so that the fuel injection nozzle injects fuel toward the edge portion above the fuel evaporation groove at medium engine loads.

In the above-described engine, the fuel injected from the fuel injection nozzle at medium engine loads strikes the edge portion and is divided into two portions, that is, a first portion flowing along a surface of the fuel evaporation groove formed in the deep dish portion and a second portion flowing along a bottom surface of the peripheral portion. The fuel of the first portion is nearly perfectly evaporated with the help of a swirl to generate a combustible fuel-air mixture which is guided by the fuel evaporation groove to a spark plug position. The fuel of the second portion is prevented from flowing out of the peripheral portion by an upwardly extending side surface of the peripheral portion and tends to stay in the recessed peripheral portion to generate a moderately rich mixture in the peripheral portion. The moderately rich mixture in the peripheral portion helps to propagate flame from the deep dish portion to all other areas inside the cylinder including the shallow dish portion.

BRIEF DESCRIPTION OF THE DRAWINGS

The above-described object and other objects, features, and advantages of the present invention will become apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
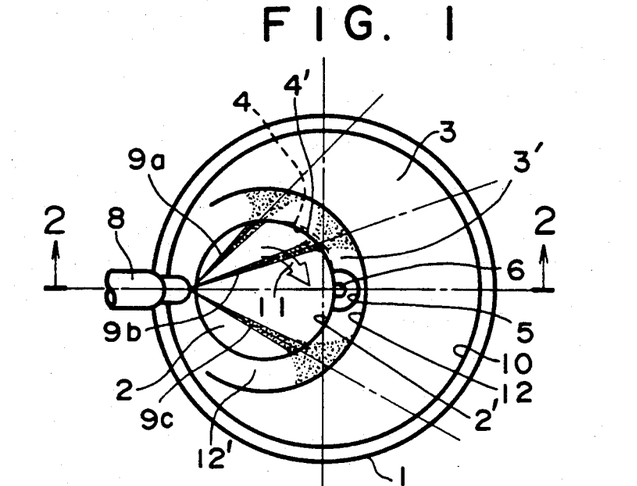
FIG. 1 is a plan view of a direct fuel injection type spark ignition internal combustion engine in accordance with any embodiment of the invention.
Figure 2:
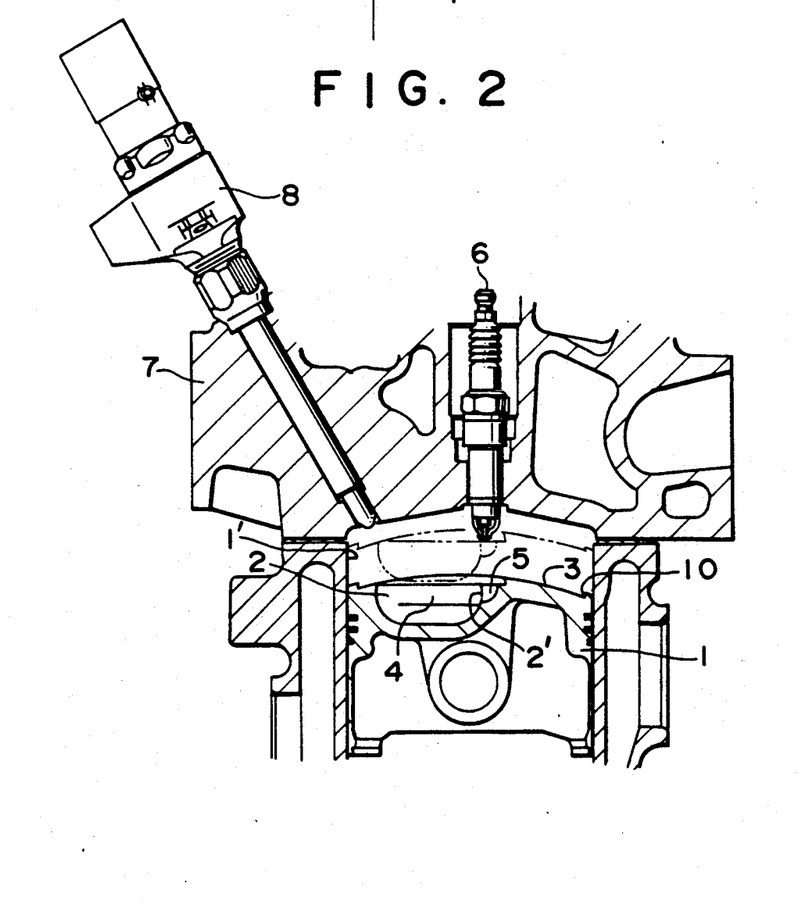
FIG. 2 is a cross-sectional view along line 2—2 in the direction of the arrows of the engine of FIG. 1.

Engine structures, which are applicable to any embodiment of the invention, are shown in FIGS. 1 and 2. As illustrated in FIGS. 1 and 2, a direct fuel injection type spark ignition internal combustion engine in accordance with the present invention includes a piston/cylinder structure, a spark plug 6 and a fuel injection nozzle 8. The piston/cylinder structure includes a cylinder 1', a piston 1 reciprocally movable in the cylinder, and a cylinder head 7 located above the cylinder. The cylinder 1', the piston 1 and the cylinder head 7 define a combustion chamber therein. The combustion chamber has an axis coinciding with a longitudinal axis of the cylinder and a radially outer portion. The spark plug 6 is located close to the axis of the combustion chamber, and the fuel injection nozzle 8 is located at the radially outer portion on an opposite side of the chamber from the spark plug.

The piston 1 includes a deep recessed dish portion (a deep dish portion) 2, a recessed peripheral portion (a peripheral portion) 3' partially surrounding the deep dish portion, a shallow recessed dish portion (a shallow dish portion) 3 surrounding the peripheral portion, and a plug pocket 5, all formed in a top portion of the piston 1. The peripheral portion 3' includes a bottom surface 12' and a side surface 12 upwardly extending from a radially outermost portion of the bottom surface. The peripheral portion 3' has a depth smaller than the deep dish portion 2 and greater than the shallow dish portion 3 and a diameter larger than the deep dish portion 2 and smaller than the shallow dish portion 3.

The deep dish portion 2 has a side surface 2' where the plug pocket 5 opens to the deep dish portion. The deep dish portion 2 includes a fuel evaporation groove 4 in the side surface upstream of the plug pocket 5 in a direction of a swirl 11 generated in the deep dish portion 2. The fuel evaporation groove 4 has a slanting surface. The deep dish portion 2 further includes an edge portion 4' at a top of the fuel evaporation groove 4, via which the fuel evaporation groove 4 is connected to the bottom surface 12' of the peripheral portion 3'.

The deep dish portion 2 has a circular contour in plan view and an axis extending parallel to the axis of the combustion chamber. The axis of the deep dish portion 2 is located on the same side of the axis of the combustion chamber as the fuel injection nozzle 8. Due to this location of the deep dish portion 2, the deep dish portion 2 is close to the fuel injection nozzle 8, so that a good response at low engine loads is obtained. The plug pocket 5 is located on a side of the axis of the combustion chamber away from the fuel injection nozzle 8, but close to the axis of the combustion chamber. The location of the plug pocket 5 near the axis of the combustion chamber makes designing of a four-valve engine easy. The plug pocket 5 formed in the piston 1 receives a lower end portion (an ignition portion) of the spark plug 6 when the piston 1 comes to its highest position in reciprocal motion.

The peripheral portion 3' has a partially circular contour in plan view and an axis which is coincident with the axis of the deep dish portion 2. The bottom surface of the peripheral portion 3' is connected step-wise to the bottom surface of the shallow dish portion 3 via the side surface 12 of the peripheral portion 3', except for a portion in the vicinity of the fuel injection nozzle 8. In the vicinity of the fuel injection nozzle 8, the bottom surface of the peripheral portion 3' is smoothly and steplessly connected to a bottom surface of the shallow dish portion 3. The side surface 12 prevents the fuel injected onto the bottom surface of the peripheral portion from flowing out of the peripheral portion 3'.

The shallow dish portion 3 has a circular contour in plan view and an axis which is coincident with the axis of the combustion chamber. The shallow dish portion 3 has its main portion with a large area on a side of the axis of the combustion chamber away from the fuel injection nozzle 8.

The shallow dish portion 3 includes a bottom surface and a side surface 10 extending upwardly from a radially outermost portion of the bottom surface of the shallow dish portion. The bottom surface of the shallow dish portion 3 is curved and convex in an upward direction so that an angle defined between a fuel injection direction and the bottom surface of the shallow dish portion 3 is small and the fuel colliding with the bottom surface is widely spread along the bottom surface of the shallow dish portion 3. The side surface 10 of the shallow dish portion 3 prevents the spreading fuel from flowing out of the shallow dish portion 3 and adhering to a cylinder bore surface.

The spark plug 6 extends in parallel with the axis of the combustion chamber. The spark plug 6 is located on an opposite side of the axis of the combustion chamber from the fuel injection nozzle 8 and is located close to the axis of the combustion chamber. The spark plug 6 has an ignition portion at a lower end thereof which protrudes into the combustion chamber from a lower surface of the cylinder head 7. The spark plug 6 is located just above the plug pocket 5 so that the plug pocket 5 receives the ignition portion of the spark plug 6 when the piston 1 comes to its highest position.

The fuel injection nozzle 8 has a body that extends obliquely from the radially outer portion of the combustion chamber in an upward and radially outward direction. The fuel injection nozzle 8 has at least one injected fuel path for injecting fuel. Reference numerals 9a, 9b, and 9c illustrate fuel sprays injected through the injected fuel paths of the fuel injection nozzle 8.

FIGS. 3 to 8 and FIGS. 9 to 11 illustrate various types of fuel injections.

Figure 3:
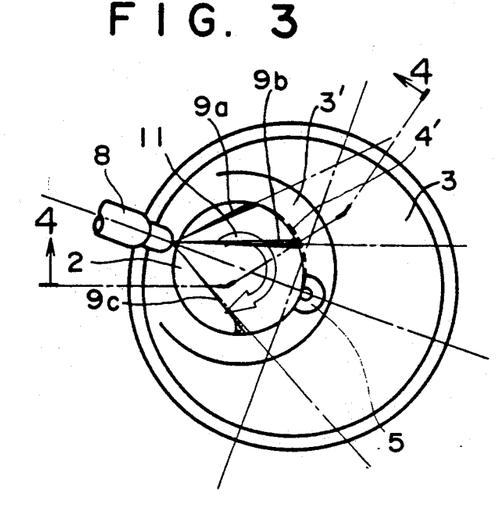
FIG. 3 is a plan view of a combustion chamber of the engine of FIG. 1 in a state where fuel is being injected into a deep dish portion.
Figure 4:
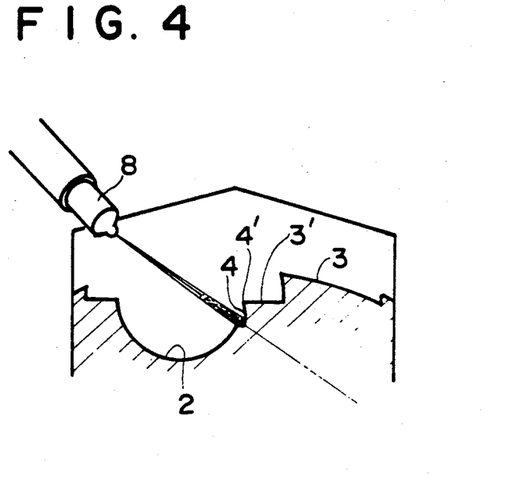
FIG. 4 is a cross-sectional view along line 4—4 in the direction of the arrows of the combustion chamber of FIG. 3.
Figure 9:
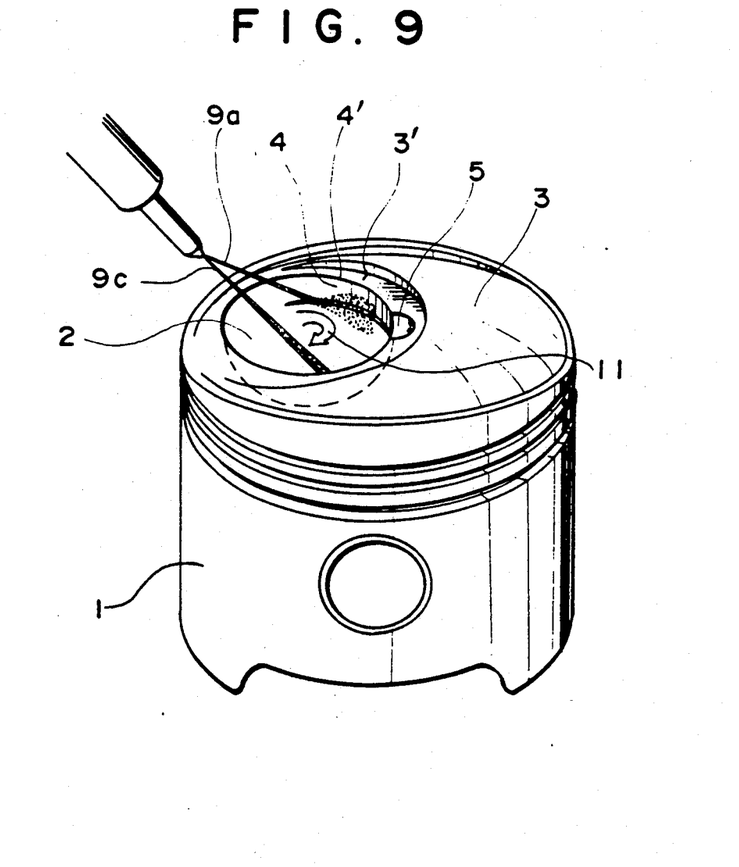
FIG. 9 is a perspective view of the combustion chamber of FIG. 3.

FIGS. 3, 4, and 9 illustrate a case where fuel injection is executed when the piston 1 is at a relatively high position. In this case, fuel is injected into the deep dish portion 2, and a main portion of the injected sprays 9a, 9b, and 9c collides with and adheres to the fuel evaporation groove 4. This fuel injection is typically seen at low engine loads including idling.

Figure 5:
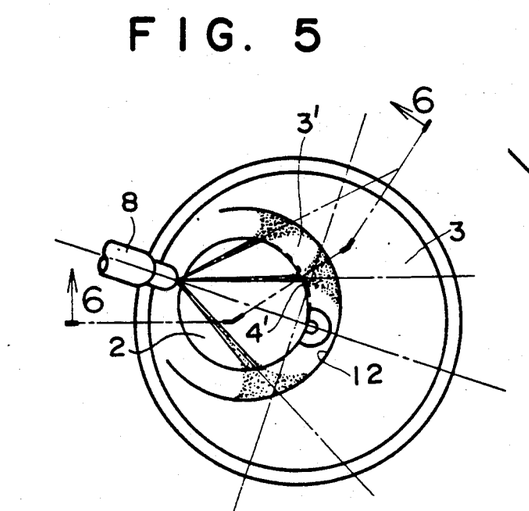
FIG. 5 is a plan view of the combustion chamber of the engine of FIG. 1 in a state where fuel is being injected into a peripheral portion.
Figure 6:
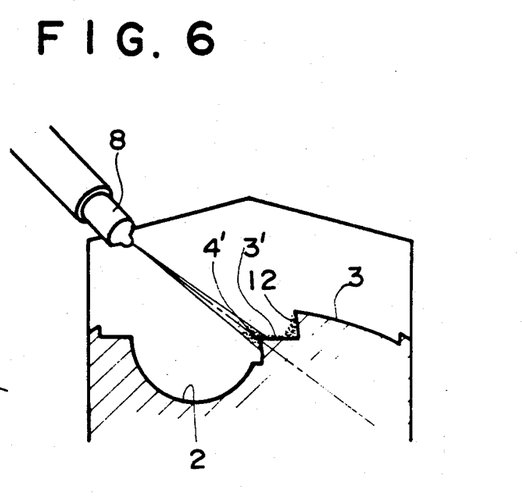
FIG. 6 is a cross-sectional view along line 6—6 in the direction of the arrows of the combustion chamber of FIG. 5.
Figure 10:
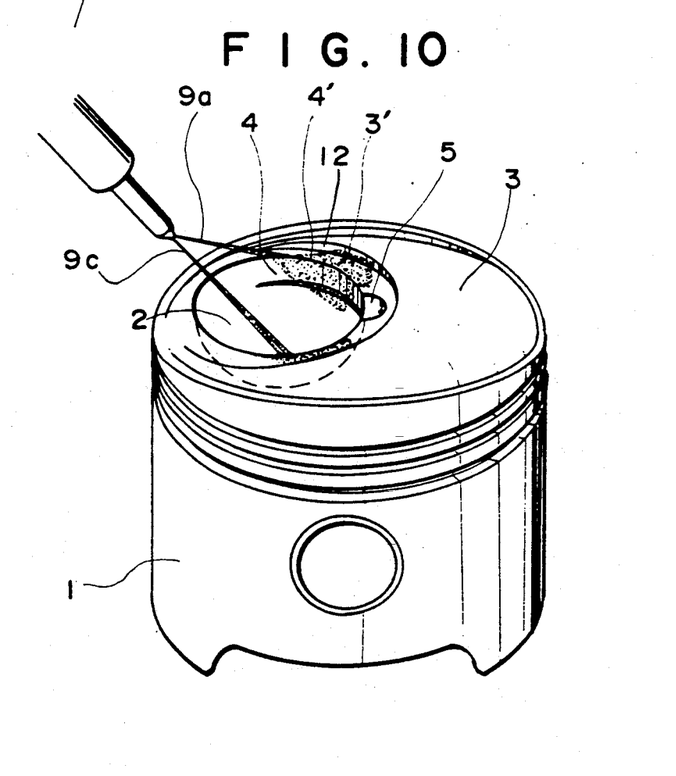
FIG. 10 is a perspective view of the combustion chamber of FIG. 5.

FIGS. 5, 6, and 10 illustrate a case where fuel injection is executed when the piston 1 is at a medium-height position. In this case, fuel is injected toward the edge portion 4' and is divided by the edge portion 4' into two portions, that is, a first portion flowing into the peripheral portion 3' and a second portion flowing into the deep dish portion 2. This fuel injection is typically seen at medium engine loads.

Figure 7:
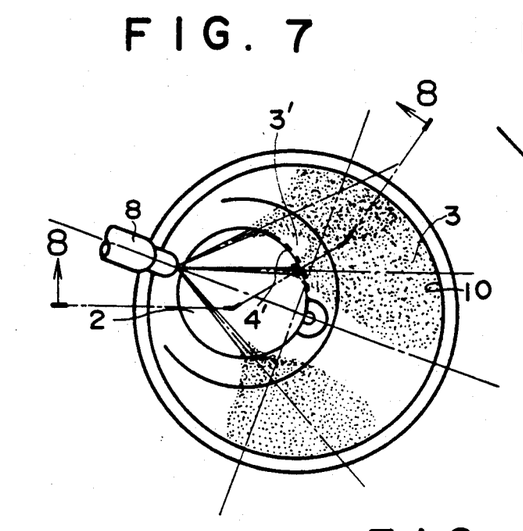
FIG. 7 is a plan view of the combustion chamber of the engine of FIG. 1 in a state where fuel is being injected into a shallow dish portion.
Figure 8:
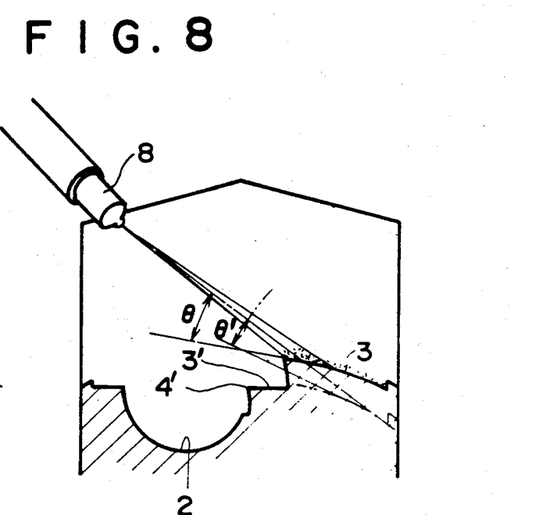
FIG. 8 is a cross-sectional view along line 8—8 in the direction of the arrows of the combustion chamber of FIG. 7.
Figure 11:
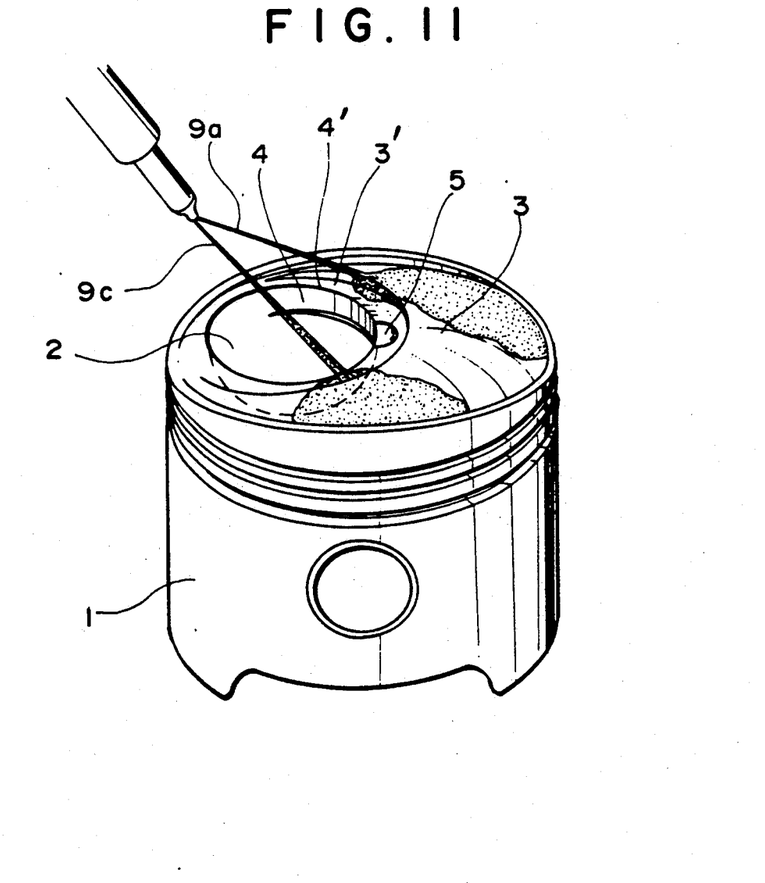
FIG. 11 is a perspective view of the combustion chamber of FIG. 7.

FIGS. 7, 8, and 11 illustrate a case where fuel injection is executed when the piston 1 is at a relatively low position. In this case, fuel is injected onto the bottom surface of the shallow dish portion 3. This fuel injection is typically seen at an early stage of a fuel injection period at high engine loads.

Figure 12:
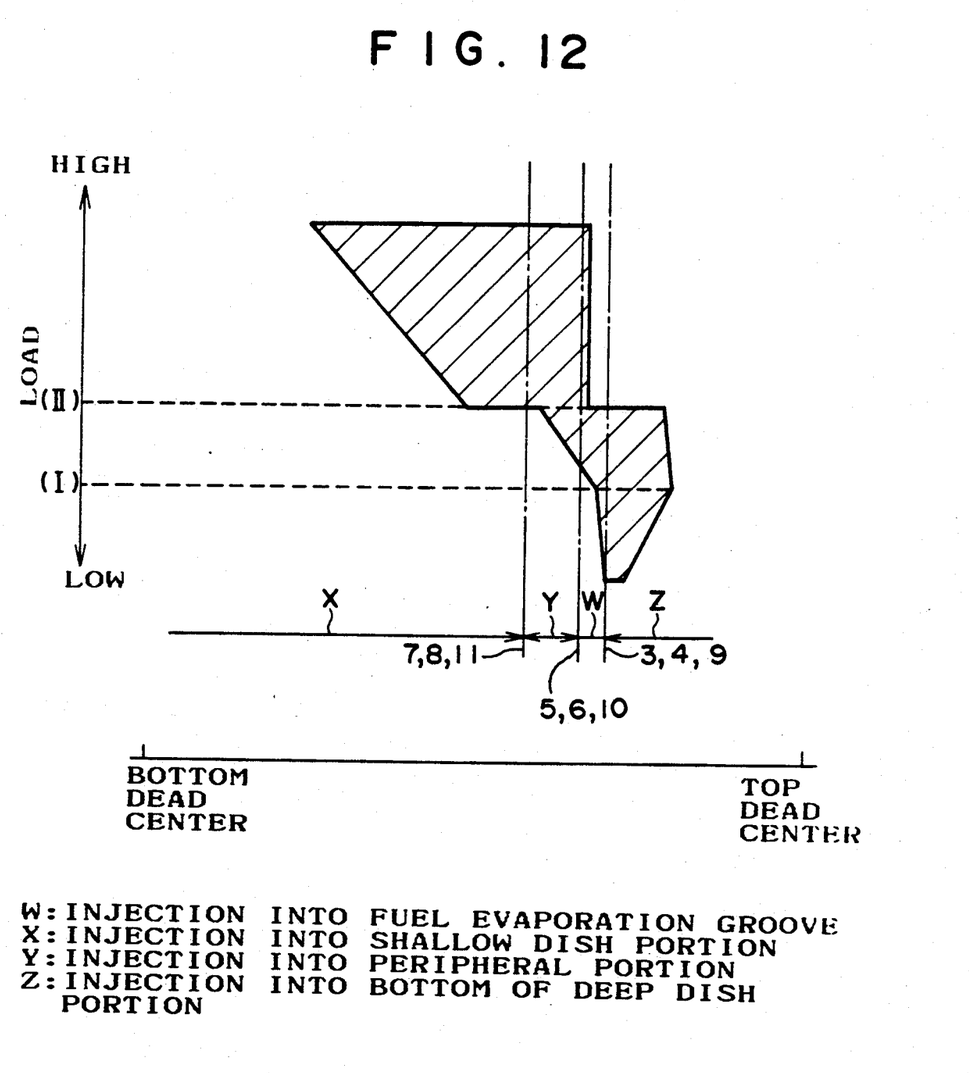
FIG. 12 is a diagram illustrating a fuel injection timing in accordance with a first embodiment of the invention.

FIG. 12 illustrates a fuel injection timing in accordance with a first embodiment of the invention. At low engine loads below load (I), fuel injection begins when the piston 1 comes to a relatively high position (position of FIGS. 3, 4, and 9), and fuel injection ends when the injected fuel collides with the bottom surface of the deep dish portion 2. At medium engine loads between load (I) and load (II), fuel injection begins when the piston comes to a medium-height position (position of FIGS. 5, 6, and 10) and fuel injection ends when fuel is injected into the deep dish portion 2. At high engine loads above load (II), fuel injection begins when the piston is at a relatively low position (position of FIGS. 7, 8, and 11), and fuel injection ends when fuel is injected into the peripheral portion 3'. At high engine loads and medium engine loads, the higher the engine load is and the longer the fuel injection period is, the earlier the fuel injection begins.

Figure 13:
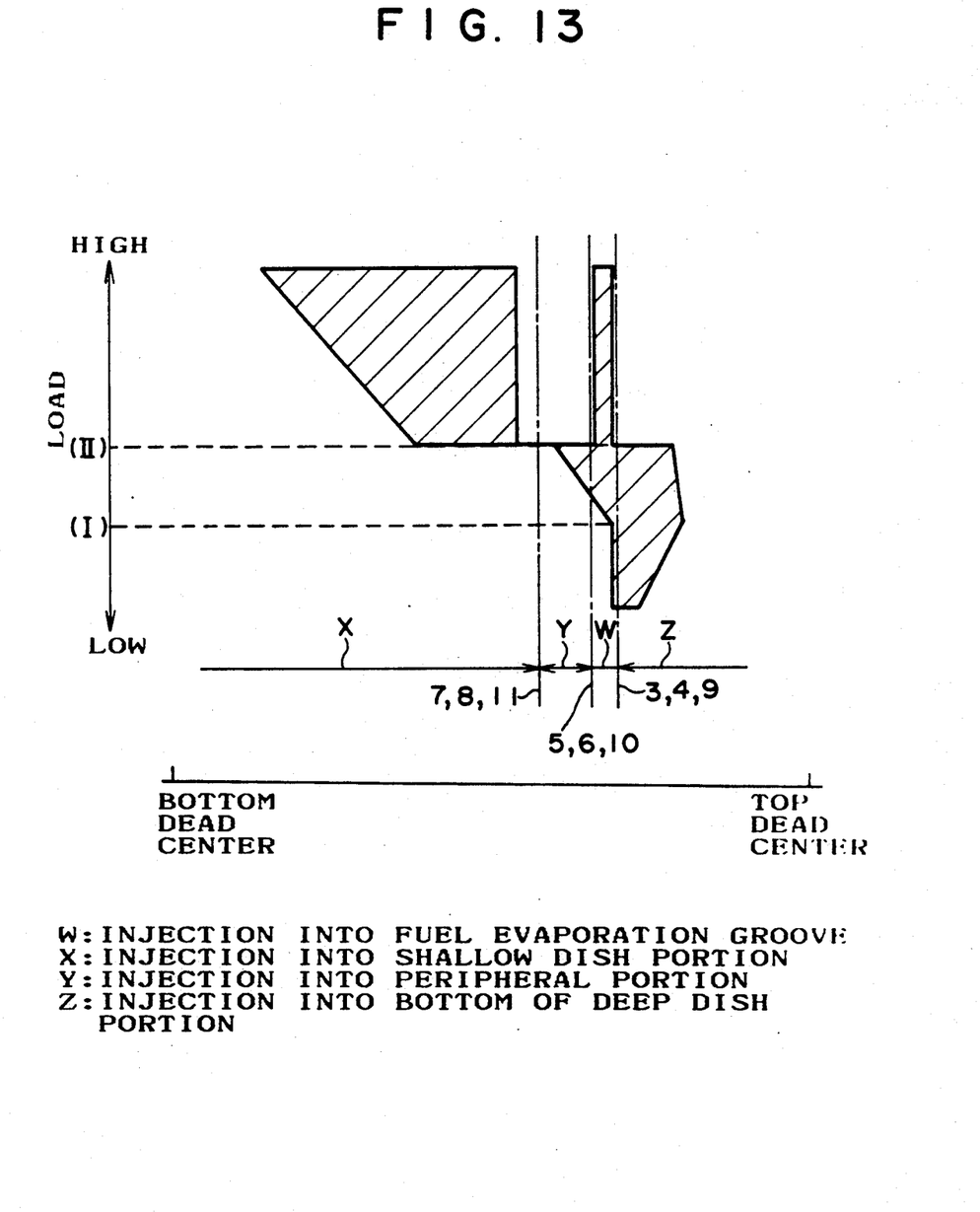
FIG. 13 is a diagram illustrating a fuel injection timing in accordance with a second embodiment of the invention.

FIG. 13 illustrates a fuel injection timing in accordance with a second embodiment of the invention. The fuel injection timing at medium and low engine loads below load (II) is the same as that of the fuel injection timing of the first embodiment. At high engine loads above load (II), the fuel injection period is divided into two portions: a first portion and a second portion which are separate in time from each other. Timing of the beginning of fuel injection in the first portion is set earlier than the timing of the beginning of fuel injection in the first embodiment to provide a longer period of time for evaporation and thereby prevent smoke generation. Timing of the beginning of fuel injection in the second portion is determined so that fuel injected in the second portion collides with the surface of the fuel evaporation groove 4, whereby good ignition is obtained.

Figure 14:
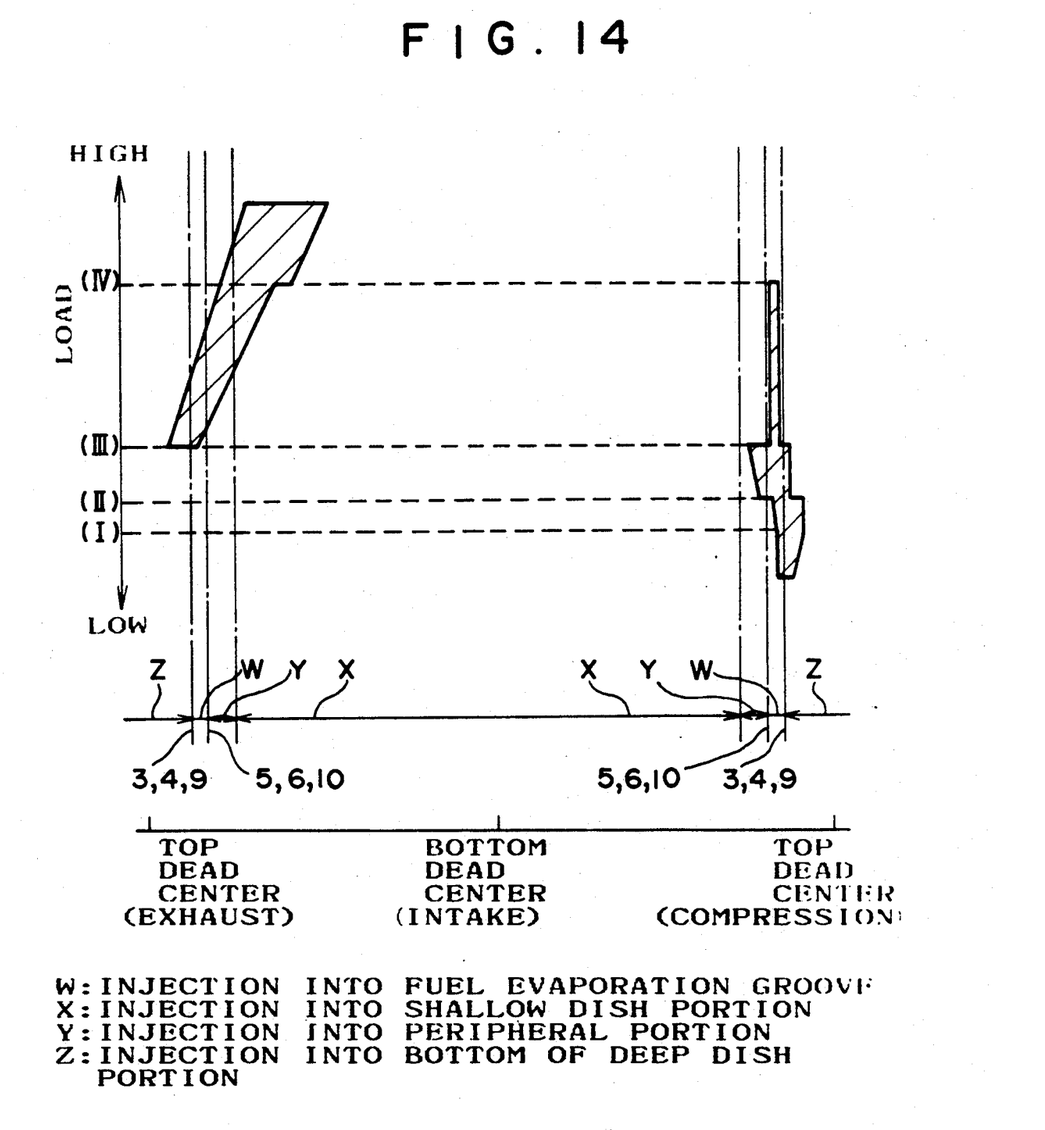
FIG. 14 is a diagram illustrating a fuel injection timing in accordance with a third embodiment of the invention.

FIG. 14 illustrates a fuel injection timing in accordance with the third embodiment of the invention. In this embodiment, the fuel injection period is divided into two portions, that is, a first portion and a second portion at high engine loads. However, unlike the second embodiment, at high engine loads between load (III) and load (IV), the first portion is set in an intake stroke of the engine so that a sufficiently long time is provided for evaporation of the fuel injected in the first portion. The second portion is set in a compression stroke of the engine like the second embodiment. Further, at very high engine loads above load (IV), fuel is injected in a single fuel injection period because air/fuel ratio in the combustion chamber is sufficiently rich and the fuel injection period does not need to be divided at such very high engine loads.

Operation of the engine having the above-described structures will now be explained.

At low engine loads, fuel is injected into the deep dish portion 2 (see FIGS. 3, 4, and 9). The fuel adhering to the surface of the deep dish portion 2 is heated by the surface of the deep dish portion 2 and is also heated from the mixture of fuel and air which rises in temperature due to compression sufficiently for the fuel to be evaporated. Fuel evaporation is promoted by a swirl 11 generated in the deep dish portion 2. The evaporated fuel is mixed with air existing in deep dish portion 2 to generate a rich mixture and is conveyed by the swirl 11 to the plug pocket 5, where the rich mixed gas is ignited by the spark plug 6. Since the fuel evaporation groove 4 guides the evaporated fuel to the spark plug position, a good ignition is obtained. The flame propagates to the remaining mixed gas staying in the deep dish portion 2.

At medium engine loads, fuel is injected toward the edge portion 4' (see FIGS. 5, 6, and 10), where the fuel is divided into two portions, that is, a first portion flowing into the peripheral portion 3' and a second portion flowing into the deep dish portion 2. The fuel of the first portion is spread along the bottom surface of the peripheral portion 3' so that fuel evaporation is promoted. However, the fuel of the first portion is prevented from flowing out of the peripheral portion 3' by the side surface 12 of the peripheral portion 3' so that an excessive spreading of the fuel is prevented and the fuel-air mixture in the peripheral portion 3' is maintained moderately rich. This moderately rich mixture in the peripheral portion 3' helps to propagate flame from the deep dish portion 2 to all other areas of the combustion chamber including the shallow dish portion 3. The fuel of the second portion, which flows into the deep dish portion 2, forms a fuel membrane along the surface of the fuel evaporation groove 4 so that fuel evaporation is promoted with the help of a swirl 11. Then, the evaporated fuel is conveyed to the plug pocket 5 where the rich mixture including the evaporated fuel is ignited by the spark plug 6. Therefore, good ignition is maintained.

At high engine loads, fuel is injected into the shallow dish portion 3 at an early stage of the fuel injection period (see FIGS. 7, 8, and 11) and is injected into the peripheral portion 3' at a late stage of the fuel injection period. The injected fuel collides with the bottom surface of the shallow dish portion 3 with a relatively small angle $\theta$ because the bottom surface of the shallow dish portion is formed upwardly convex. When the piston 1 is at a low position, the injected fuel collides with the piston at a radially outer portion with a small angle $\theta'$. Due to this collision with a small angle, the fuel is widely spread along the surface of the shallow dish portion 3 so that a thickness of the fuel membrane adhering the surface of the shallow dish portion 3 is small. This wide spreading and small thickness of the fuel membrane promotes fuel evaporation, and almost all portions of the injected fuel are evaporated, even though the piston is at a low position and therefore the swirl is yet weak. The evaporated fuel is well mixed with air with the help of a squish flow and a swirl which are strongly generated when the piston 1 approaches its highest position. As a result, good combustion is obtained in a high engine load operation. Further, a nearly tangential collision of the fuel with the bottom surface of the shallow dish portion 3 suppresses splashing of fuel into a space above the surface, and knocking due to floating fuel generated by such splashing is effectively suppressed.

In accordance with the present invention, the following advantages are obtained.

First, since peripheral portion 3' between the deep dish portion 2 and the shallow dish portion 3 is provided and the fuel injection timing is predetermined so that fuel is injected to the edge portion 4' at medium engine loads, the fuel injected to the edge portion 4' at medium engine loads is divided into two portions, that is, a fuel portion flowing into the peripheral portion 3' and a fuel portion flowing into the deep dish portion 2. The fuel flowing into the peripheral portion 3' is prevented from flowing out of the peripheral portion 3' by the side surface 12 of the peripheral portion 3' to generate a moderately rich mixture in the peripheral portion 3'. Since the moderately rich mixture helps to propagate flame from the deep dish portion 2 to the shallow dish portion 3, flame propagation in the combustion chamber at medium engine loads is greatly improved. On the other hand, since the fuel flowing into the deep dish portion 2 generates evaporated fuel in the deep dish portion 2, good ignition is maintained. Therefore, an excellent flame propagation and combustion is obtained even at medium engine loads.

Second, since the bottom surface of the shallow dish portion 3 is formed convex, an angle defined between the fuel injection direction and the convex bottom surface is small so that spreading of the fuel along the convex bottom surface and fuel evaporation at the surface are promoted. Since the convex bottom surface prevents the fuel from splashing into the combustion chamber, knocking is also suppressed. As a result, good combustion and suppression of knocking are obtained at high engine loads.

Third, since the side surface of the deep dish portion 2 has the fuel evaporation groove 4, evaporated fuel is smoothly led to the plug pocket 5 so that smooth ignition is possible at low engine loads.

Although only a few embodiments of the invention have been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. A direct fuel injection type spark ignition internal combustion engine comprising:
   a piston/cylinder structure including a cylinder, a piston reciprocally movable in the cylinder, and a cylinder head located above the cylinder, the cylinder, the piston and the cylinder head defining a combustion chamber having an axis coincident with a longitudinal axis of the cylinder and a radially outer portion, the piston including a deep dish portion, a peripheral portion at least partially surrounding the deep dish portion, a shallow dish portion at least partially surrounding the peripheral portion, and a plug pocket, all formed in a top portion of the piston, the peripheral portion having a depth smaller than the deep dish portion and greater than the shallow dish portion and a diameter larger than the deep dish portion and smaller than the shallow dish portion, the deep dish portion having a side surface where the plug pocket opens to the deep dish portion, the deep dish portion including a fuel evaporation groove formed in the side surface upstream of the plug pocket in a direction of a swirl generated in the deep dish portion and an edge portion located at a top of the fuel evaporation groove so that the fuel evaporation groove is connected to the peripheral portion via the edge portion;
   a spark plug located in the cylinder head close to the axis of the combustion chamber, the spark plug having an ignition portion protruding into the combustion chamber, the plug pocket of the piston receiving the ignition portion of the spark plug therein when the piston comes to its highest position; and
   a fuel injection nozzle located at the radially outer portion of the combustion chamber, a fuel injection timing of the fuel injection nozzle being predetermined so that the fuel injection nozzle injects fuel toward the edge portion above the fuel evaporation groove at medium engine loads.

2. An engine according to claim 1, wherein the deep dish portion has a circular contour in plan view and an axis located on the same side of the axis of the combustion chamber as the fuel injection nozzle.

3. An engine according to claim 1, wherein the peripheral portion has a substantially circular contour in plan view and an axis coincident with an axis of the deep dish portion.

4. An engine according to claim 1, wherein the shallow dish portion has a circular contour in plan view and an axis coincident with the axis of the combustion chamber.

5. An engine according to claim 1, wherein the shallow dish portion has a main portion with a large area on a side of the axis of the combustion chamber away from the fuel injection nozzle.

6. An engine according to claim 1, wherein the shallow dish portion has a bottom surface which is convexly curved in an upward direction.

7. An engine according to claim 6, wherein the shallow dish portion has a side surface extending upwardly from a radially outermost portion of the bottom surface of the shallow dish portion.

8. An engine according to claim 1, wherein the spark plug extends in parallel with the axis of the combustion chamber.

9. An engine according to claim 1, wherein the fuel injection nozzle has a body that extends obliquely from the radially outer portion of the combustion chamber in an upward and radially outward direction.

10. An engine according to claim 1, wherein the fuel injection timing of the fuel injection nozzle is predetermined so that at low engine loads fuel is injected toward the deep dish portion, at medium engine loads fuel is injected toward the edge portion, and at high engine loads fuel is injected toward the shallow dish portion.

11. An engine according to claim 10, wherein the fuel injection timing is predetermined so that the fuel injection at high engine loads is divided into a first fuel injection and a second fuel injection which are separate in time from each other.

12. An engine according to claim 11, wherein the first fuel injection and the second fuel injection are set in a compression stroke of the engine.

13. An engine according to claim 11, wherein the first fuel injection is set in an intake stroke of the engine and the second fuel injection is set in a compression stroke of the engine.

* * * * *